3,106,971
                         AGRICULTURAL IMPLEMENT
        Richard W. Bushmeyer and Clarence E. Henson, Jr.,
           Rockford, Ill., assignors to J. I. Case Company, a cor-
           poration of Wisconsin
        Original application Aug. 9, 1957, Ser. No. 677,368, now
           Patent No. 2,990,892, dated July 4, 1961. Divided
           and this application Oct. 28, 1960, Ser. No. 65,733
                          4 Claims.  (Cl. 172—386)

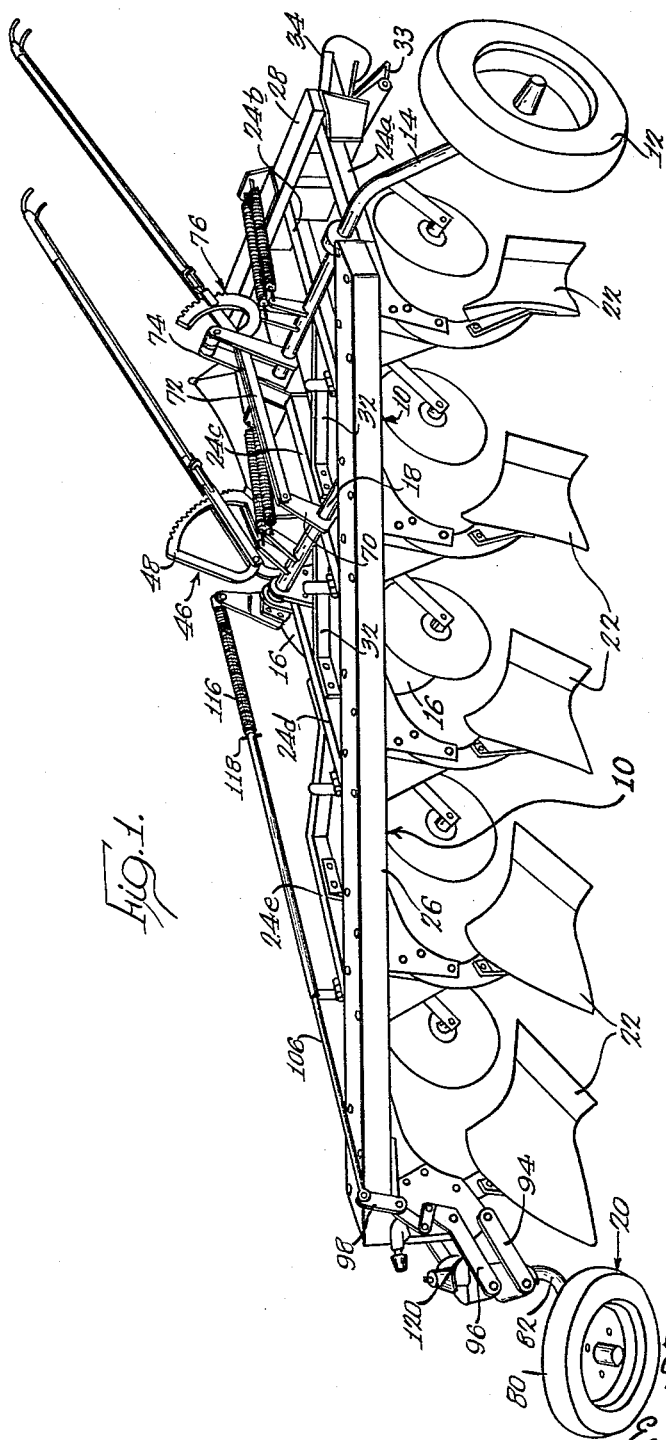

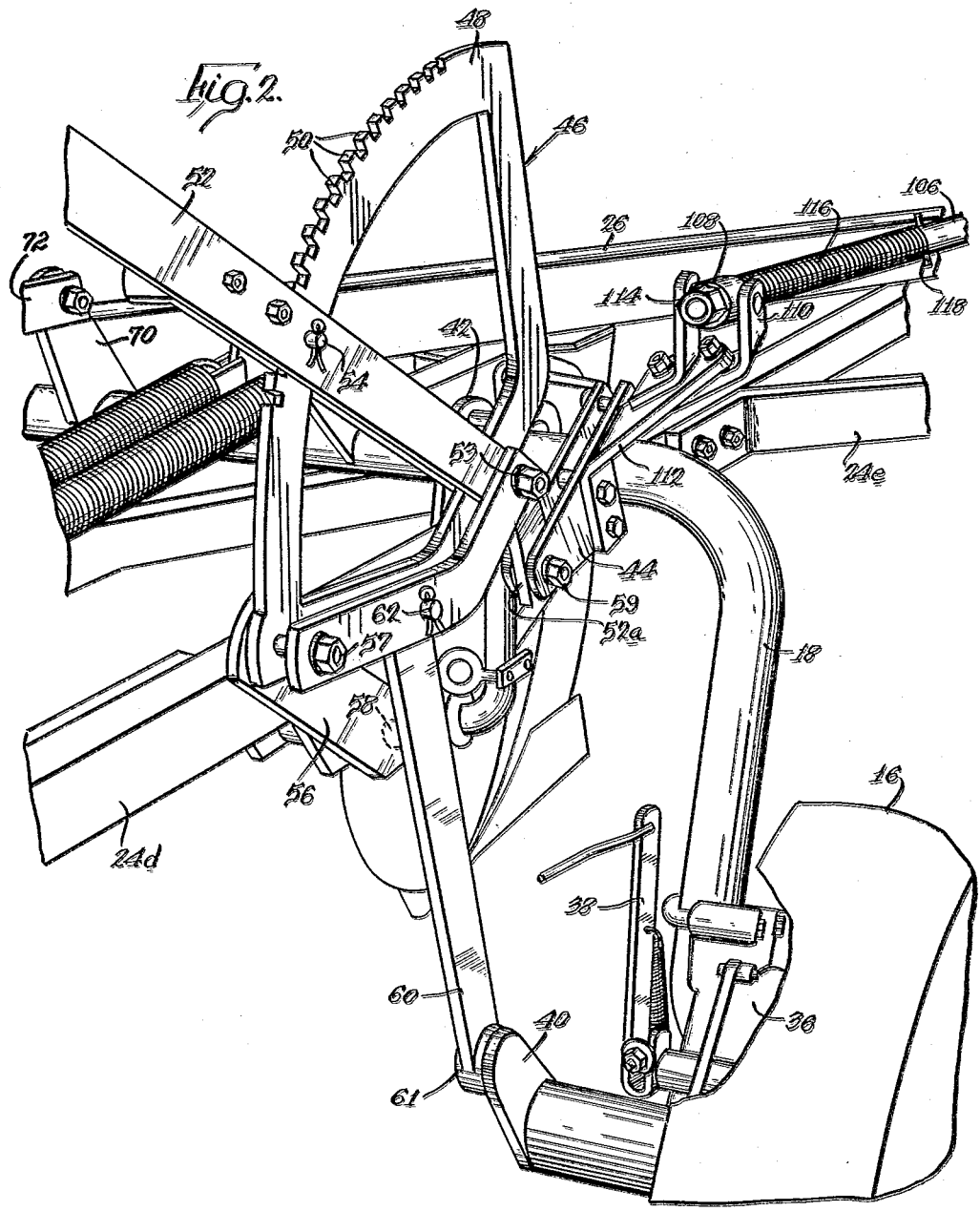

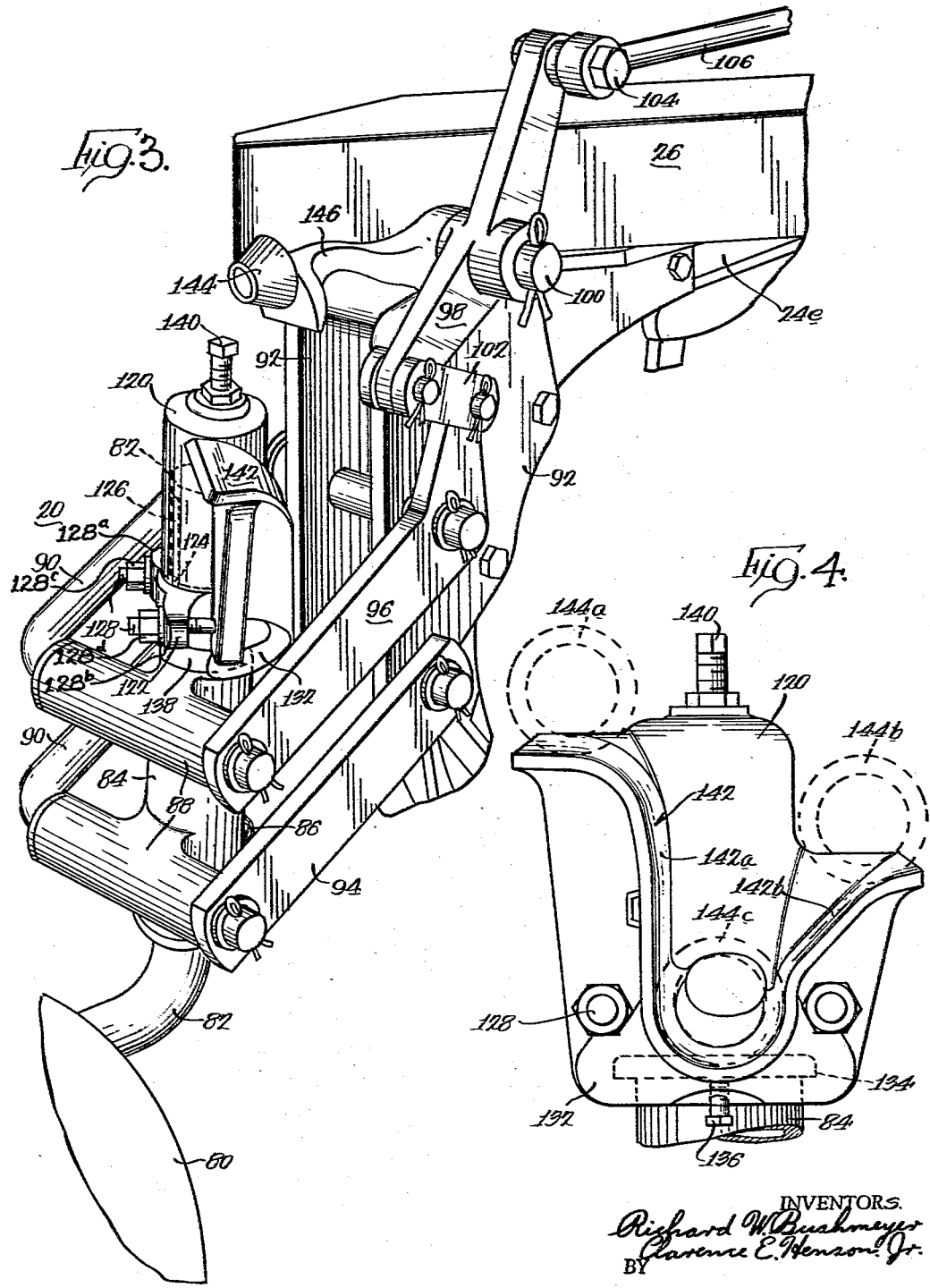

This invention relates generally to agricultural implements and is more particularly directed to improvements in tractor drawn plows, being a division of prior application, Serial Number 677,368, filed August 9, 1957, now Patent No. 2,990,892.

In the design and construction of earth-working implements, such as plows, there is usually provided means for adjusting the depth of penetration of the earth-working tool. In wheel supported implements, which are adapted to be drawn by a vehicle such as a tractor, it is also necessary to provide for vertical adjustment between the frame and the supporting wheel structure, in order to be able to move the tools supported on the frame between an elevated position of transport and a lowered, ground working position. Various adjusting means have been devised heretofore, which have attempted to correlate the two mentioned adjustments.

Furthermore, the above-mentioned problem of uniform ground clearance is particularly troublesome with relatively long ground-working implements, such as multiple-bottom plows, wherein the clearance provided for the plow bottoms in their transport position is dependent to a substantial extent upon the vertical adjustment provided for the implement at points spaced in a lengthwise direction. In a multiple-bottom plow there is usually provided a three wheel support, comprising a land wheel, a forward furrow wheel and a rearward furrow or tail wheel. While the adjustment of the land and forward furrow wheels raises and lowers the plow bottoms, some adjustment must also be provided for the rear furrow wheel, if the clearance provided for the several plow bottoms is to be substantially uniform and the plow is to be transported in a substantially level position. Consequently, any effective means for raising and lowering the plow bottoms should include a suitable corresponding adjustment for the vertical position of the rear furrow wheel.

It is the principal object of this invention to provide means for vertically adjusting a wheel-supported, earth-working implement.

It is also an object of this invention to provide improved means for vertically adjusting and positioning the rear or tail wheel of a tractor drawn plow, including novel means for locking such rear wheel in position for plowing operations. Other objects and advantages will be apparent from the following description of a selected embodiment of the invention, as seen in the accompanying drawings, wherein:

FIGURE 1 is a perspective view of a multiple-bottom tractor-drawn plow.

FIGURE 2 is an enlarged elevational view, in perspective, of the lift mechanism for the plow.

FIGURE 3 is an enlarged fragmentary view, in perspective, of the rear wheel structure.

FIGURE 4 is an enlarged elevational view of a portion of the structure seen in FIGURE 3.

With reference to FIGURE 1, it will be seen that the selected embodiment is a tractor-drawn, five-bottom plow including a frame structure 10, a forward furrow wheel 12 supported on the frame by a crank axle 14 so as to afford swinging movement of the furrow wheel relative to the frame, a land wheel 16 also swingably mounted on a second crank axle 18, a rear furrow wheel or tail wheel structure 20, and a series of moldboard plows 22 fixed to the frame.

More particularly, it will be noted that the plow frame 10 comprises a plurality of plow beams 24a, 24b, 24c, 24d and 24e, which are disposed in generally parallel and laterally spaced positions on the frame, a rear frame member 26 which rigidly joins the rearward ends of the plow beams in staggered relation to each other, preferably through the use of bolted connections between the frame members and the plow beams, and a forward frame member 28 which rigidly joins the front ends of the plow beams on the four forwardmost plows. The use of the fabricated beams 26 and 28 provides a very rigid construction, and additional bracing may be readily and inexpensively provided between intermediate portions of the several plow beams, as by the brace members 32.

Suitable means is provided at the forward end of the plow structure for coupling the latter with a tractor or other pulling unit. Preferably, the hitch mechanism includes a cross bar 33 which is pivotally connected with each of the four forwardly extending plow beams, and a draw bar structure 34 extends forwardly from this cross bar in position for attachment with a tractor drawbar or the like.

Referring now particularly to FIGURE 2, it is seen that the lift mechanism provided for the plow comprises a lifting clutch 36 which is carried by the crank axle 18 and is connected with the land wheel 16 for operation thereby in a known manner to provide for lifting of the plow in response to rotation of the wheel 16. The lift clutch 36 includes a trip lever 38 which is operable from a position on the tractor. When the clutch is connected in driven relation with wheel 16, the rotation of wheel 16 effects a corresponding swinging movement of a crank arm 40 which is disposed adjacent the inner side of the land wheel. As will be seen hereinafter, this rotation of the crank arm 40 is effective to swing the crank axle 18 relatively to the plow frame and thereby raise and lower the plow frame relatively to the ground.

The crank axle 18 for the land wheel 16 is suitably rotatably mounted on the plow frame, as by a plurality of bearing brackets 42, and this crank axle has fixed thereto, in forwardly extending relation, an arm or bracket 44 which is connected at its free end with the depth adjusting means for the plow, indicated generally at 46 in FIGURE 2. More particularly, the depth adjusting means 46 comprises an adjusting quadrant 48 having an arcuate portion including a series of notches 50 therein, and an adjusting lever 52. The lever 52 is pivotally mounted on the quadrant 48, as by a bolt 53, for swinging movement relative thereto, and this lever also includes a pin 54 or the like in position for selective engagement with one of the notches 50 on the quadrant. The forward portion of the quadrant 48 is pivotally connected to the plow frame by means of the link 56. One end of the link 56 is pivoted on the quadrant, through means of a bolt 57, and the other end of this link is pivotally connected to a bracket fixed on the beam 24d, as by a pin 58. A rearward portion of the adjusting quadrant is pivotally connected with the crank axle 18, through a lower end portion 52a of the lever 52, as by the bolt 59. Thus it is seen that the adjusting quadrant 48 is supported on the plow by a double-pivot toggle linkage, referred to herein as a double-toggle linkage, so that the adjusting quadrant 48 is movable longitudinally of the plow frame as well as vertically with respect to the frame. The adjusting quadrant is also pivotally connected to the crank arm 40 on the lifting clutch 36 by means of a lift link 60. This lift link 60 has its lower end pivotally connected to the outer end portion of the crank arm 40 on the lift clutch, as by a pin 61, and the upper end portion of the lift link 60 is pivotally connected to the quadrant 48, as by a pin 62, at a position intermediate the two supporting pivots 58 and 59 for the quadrant.

As a result of the movement thus afforded for the various members of the lift linkage 46, the plow bottoms 22 are raised, by operation of clutch 36, to substantially the same elevation with respect to the ground line even though the plows are adjusted for widely varying working depths.

In the preferred embodiment of the invention, wherein the clutch 36 is a known type generally referred to as a half-revolution clutch, the positions of engagement for the clutch are disposed so that about 220 degrees of clutch rotation is utilized on the lift portion of the cycle and about 140 degrees of clutch rotation is used for the lowering portion of the clutch operation.

It is seen, therefore, that the operation of the clutch 36 during the lift cycle effects a substantially constant height of the plow frame relative to the ground, irrespective of the position of the adjusting lever 52.

As the land wheel-supporting axle 18 is swung relative to the plow frame to provide the described raising and lowering of the plow bottoms, proportional movement is provided for the forward furrow wheel 12, through means including an arm 70 fixed on the crank axle 18 and a link 72 pivotally interconnecting this arm with a bracket 74 FIGURE 1, on the crank axle 14 for the front furrow wheel. Suitable adjustment is provided for the front furrow wheel 12 independently of the adjustment of the land wheel 16, by means of the lever and quadrant arrangement 76. The adjustment thus afforded for the front furrow wheel 12 is for known purposes, such as leveling the plow during the breaking of ground etc.

In an elongated implement structure, such as the illustrated five-bottom plow, it is also important to attend to the leveling of the machine in a longitudinal direction, in order to afford trash clearance for the plow in its transport position as well as to provide a proper and uniform disposition of the plow bottoms during all phases of the plowing operation. In the illustrated embodiment, this is provided for by the rear wheel structure 20, which is adjustably connected with the above described lift mechanism 46 for vertical adjustment in response to the vertical adjustment of the forward wheels on the plow.

As seen particularly in FIGURE 3, the rear wheel structure 20 comprises a wheel 80 which is rotatably mounted on a rearwardly extending end portion of a generally vertical spindle or axle 82. The upper portion of this spindle 82 is rotatably received within a cylindrical housing member 84 and is adjustably held against axial movement relative thereto in a manner which will appear, a set screw 86 extending through the housing into engagement with the spindle for locking the same against turning under special conditions. The rearward side of the spindle housing 84 includes a pair of transversely disposed, spaced-apart bearing members 88, which provide means for supporting the housing at the rear of the plow in vertically movable relation thereto. More particularly, each of the bearing members 88 has journaled therein one leg portion of a pair of U-shaped members 90 which extend forwardly in generally parallel relation, and which have the other leg portions thereof journaled in openings provided in a pair of spaced-apart plates 92 bolted or otherwise mounted on the rear portion of the plow beam 24e. The free ends of the leg portions of the U-shaped members 90 project beyond the bearings 88 and the plate 92 to provide a pivotal support for a lower link 94 and an upper link 96, which complete the double parallel link support for the spindle housing 84.

The upper supporting link 96 has an upwardly turned portion at its forward end which provides a crank for raising and lowering the parallel linkage and the spindle housing supported thereby. More particularly, a bell crank 98 is pivotally mounted, through a pin 100, supported from the adjoining plate 92, and the rearward end of this bell crank is pivotally connected to the crank portion of the upper link 96 through a link 102. A forwardly and upwardly extending portion of the bell crank 98 also includes a pin 104 affording pivotal connection with the rear end of an adjusting rod 106 for the rear wheel structure. As seen in FIGURES 1 and 2, the adjusting rod 106 extends forwardly on the plow structure and has its forward end slidably disposed in a collar 108 FIGURE 2, which is pivotally supported in a yoke 110 fixed to the upper end of a bracekt 112. The bracket 112 is bolted to the arm 44 for movement therewith upon rotation of the crank axle 18. A nut 114 which is adjustably threaded on the end of rod 106 prevents withdrawal of the rod from its collar 108, and a coil spring 116 is disposed around the rod 106 between the collar 108 and a pin 118 to afford yielding movement of the rod in a forward direction.

Thus it is seen that the rear wheel structure 20 will be raised and lowered in response to operation of the clutch 36 on the land wheel 16, through rotation of the arm 44 and the accompanying longitudinal shifting of the rod 106. The vertical movement thus afforded for the rear wheel structure is correlated with the operation of the lift linkage 46, so that the plow bottoms are essentially leveled lengthwise of the plow when the latter is in its transport and plowing positions. Furthermore, it will be noted that, with the spring 116 positioned as described, the adjusting rod 106 is permitted to move forwardly sufficiently to absorb any shock that might be imparted to the rear wheel, and to allow the tail wheel to drop to stay in the furrow if the frame 10 is raised by an obstruction.

With the use of a rear furrow or tail wheel, such as wheel 80, it is important that the rear wheel be free to caster during the turning of the plow, but that this wheel be held in a generally straight path of travel during the plowing operation. In the illustrated embodiment, the rear wheel 80 is locked in position to follow the direction of travel of the plow by novel means including cooperating locking elements carried by the rear wheel and by the plow frame structure, respectively.

The structure provided for thus controlling the rear wheel 80 includes a generally cylindrical cam member 120 FIGURE 3, which is disposed at the top of the spindle housing 84 and is fixed to the spindle 82 for rotation therewith by a clamping element 122 and normally fixed, when the plow is plowing, in relation to the plow frame or specifically in relation to plates 92. A central portion of the clamp 122 includes a key 124 which engages a longitudinal groove 126 on the upper end of the spindle to thereby provide for rotation of member 120 and the spindle 82 together. The clamp 122 is detachably fixed to the cylindrical member by a pair of bolts 128 which extend through laterally extending ear portions on the clamp and through lugs projecting outwardly from opposite sides of member 120 in fixed relation thereto.

It is necessary to be able to adjust tail wheel 80 toward the right or left in order to make it take over the side thrust resulting from the well-known tendency of the plow bottoms to cut too far sidewise into the unplowed land and this is accomplished by clamp 122. As clearly shown in FIGURE 3, said ear portions have curved surfaces 128$^a$ and 128$^b$, against which bear nuts 128$^c$ and 128$^d$, respectively, so that the nuts may seat properly with clamp 122 in various adjusted positions, shifting of the clamp being possible by reason of the normal clearance of the openings in the clamp about bolts 128. With nuts 128$^c$ and 128$^d$ tight, spindle 82 will be rigidly clamped to member 120, while loosening one nut slightly, and tightening the other, will turn clamp 122 and, by virtue of the keyed connection 124, spindle 82. This will turn or adjust spindle 82 in relation to member 120, and therefore in relation to the plow frame, as will appear.

The lower edge portion of the cylindrical member 120 includes an arcuate, flanged portion 132 (see also FIG- URE 4) which extends approximately half way around the cylinder and includes an inwardly facing groove for receiving a circumferential rim 134 on the upper end of the spindle housing 84. The member 120 is free to rotate relatively to the spindle housing, but is held against axial displacement relative thereto by interengagement of rim 134 and the groove in flange 132, a set screw 136 extending through the flange 132 to a position underlying the rim 134 to prevent rotation of member 120 when desired. The upper end of the spindle housing 84 also includes, at its rear side, a rib 138 which provides, at either edge thereof, a stop in position to engage one end of flange 132 and thereby limit the rotation of the cylindrical member 120 and the spindle 82 fixed thereto. In this way, the amount of castering provided for the rear wheel 80 is controlled. Further, there is provided a set screw 140 which is threaded through the top of the member 120, and the adjustment of this screw is effective when clamp 122 is loosened to position the spindle 82 vertically with respect to its housing 84. This will provide the limited vertical adjustment of the tail wheel necessary under varying conditions.

The outside surface of the cylinder 120 also includes a curving flange surface or cam track 142, seen particularly in FIGURE 4, which faces forwardly on the plow and is adapted for engagement by a tapered roller 144. More particularly, roller 144 is frusto-conical in shape and is disposed so that the apex of its cone is virtually at the center axis of the spindle 82 during engagement of the curved surface 142 on the cylinder 120. The roller 144 is rotatably mounted on a shaft portion of a bracket 146 which is detachably fixed in position between plate members 92. The bracket 146 also includes a cylindrical bearing or boss portion at one side for receiving the hereinbefore-mentioned pin 100 supporting the bell crank 98.

The curving surface 142 is arranged generally helically about member 120 and is designed for cooperation with the conical roller 144 in a manner such that the tangential velocity of any point on the roller about its axis is equal to the tangential velocity of a coincident point on surface 142 about the vertical axis of spindle 82, along substantially the entire length of the curved portion of surface 142. As a result, engagement of roller 144 with surface 142 during lowering movement of the plow produces a pure rolling motion for the roller 144. This not only provides for less wearing of these parts, but also enables the wheel locking mechanism to perform more smoothly and in less time than other known arrangements.

Engagement of the conical roller 144 with the curving surface 142 is, of course, effective to lock the tail wheel axle 82 against rotation within its housing 84 when the plows are lowered. This is necessary so that when the plows are in the ground, the tail wheel 80 is locked so that its direction of travel is generally parallel to the direction of travel of the plow structure. However, when the plows are raised out of the ground it is desirable that the tail wheel be free to caster, as required in turning the plow in preparation for entering a new furrow. As seen in FIGURE 3, the plows are in transport position and the conical roller 144 has been moved completely out of engagement with the curved surface 142 so that the tail wheel 80 is free to caster.

When the plow is dropped, that is the plow bottoms are lowered into the ground, through operation of clutch 36 and linkage 46, the rear tail wheel 80 is moved upwardly by virtue of the connection between rod 106 and the lift mechanism 46. As the rear wheel structure moves upwardly, the conical roller 144 engages the curved surface 142. Assuming the plow has been turning in preparation for opening a new furrow, the wheel 80 will be turned so that the roller 144 engages one of the upper edges of the surface 142, as indicated in FIGURE 4 at 144a and 144b, depending upon the direction in which wheel 80 is turned. Of course, if the tail wheel 80 is already in line with the direction of travel of the plow, the conical roller 144 will move directly into the bottom or U shaped portion of the curved surface 142, as indicated at 144c in FIGURE 4, which position is the normal plowing position, and wherein the downward pressure of the plow frame during operation is imposed upon cylinder 120 and thence upon wheel 80.

By virtue of the described relationship between the roller 144 and surface 142, as the roller engages one of the upwardly facing edge surfaces of the curving member 142, it will roll along this surface and down the side wall thereof into the centered locking position, indicated as position 144c for the roller. In this respect, it will be noted that, in the selected embodiment, one of the side wall portions 142a of surface 142 is substantially higher than the opposite side wall 142b and includes a generally straight portion. This design is for the purpose of providing greater stability for the rear wheel, against the normal lateral thrust on this wheel during plowing. Unless there is sufficient depth given to the curved surface 142 there may be a tendency for the conical roller 144 to jump out of its locked position and permit the tail wheel to caster. This is undesirable and, consequently, the long straight wall portion 142a has been placed on the side in the direction of the lateral thrust normally placed on the plow structure. Another reason for the use of one generally straight side along the curving surface 142 is to better maintain the tail wheel 80 in position when the plow bottoms strike an object and the entire structure is raised vertically. When this occurs, the momentary raising of the roller 144 will not immediately result in a release of the wheel, as the normal lateral thrust on the tail wheel will hold the roller against the straight portion of wall 142a and the roller will then drop back into its locking position seen at 144c, such motion of wheel 80 being accommodated by a compressing of spring 116.

Moreover, with the illustrated design for the curving surface 142 there is advantage in connection with moving the plows into their soil working position. If in moving into position, the plow is making a right turn, the roller 144 will initially engage the upwardly facing edge portion of the higher wall portion 142a. Consequently, the rear end of the plow will be maintained in a higher position somewhat longer as the plow is being directed into position, and the plow points will be tilted downwardly to allow them to pierce the ground before the roller 144 moves downwardly along surface 142 and the tail wheel is actually locked in its plowing position. This is very desirable because, when coming out of the right hand turn, the ground forces against the plow bottoms are the greatest and considerable guidance and stability is required for the plow in this circumstance. When coming out of a left hand turn and the plows are entering the ground, the plow bottoms are slicing into the ground and the forces are considerably less than in the case of the right hand turn where considerable pressure is being exerted against the landsides of the plows. Under the left turn conditions, as the plows are dropped, roller 144 contacts surface 142b and promptly turns cylinder 120 into working position designated as 144c. Since portion 142b is active only while the plow is coming out of a left turn, it does not need a long vertical wall as 142a, and is given a sharp slant to facilitate such turning action.

The above described adjustments afforded for the land wheel 16, the furrow wheel 12 and the tail wheel 80 correlate the vertical movement of the three wheels, so that in entering or leaving the soil the plow bottoms are essentially level with the ground. This is particularly important in connection with breaking ground. It is important that each of the plow bottoms enter the ground at essentially the same time and at the same angle with respect to the ground, if maximum efficiency is to be achieved.

It is seen from the foregoing, therefore, that there is provided a novel arrangement for locking the tail wheel in position during plowing, which arrangement is particularly advantageous in that it eliminates essentially all friction between the locking components during the necessary relative movement therebetween. The described locking arrangement for the tail wheel is also advantageous in that it prevents inadvertent release of the tail wheel, as by the plow striking an object, and operates particularly effectively to control the wheel during turning movement of the plow, so that the rear of the plow is held elevated until the bottoms are properly positioned to enter the ground and the rear wheel is then securely locked in position.

Although shown and described with respect to particular structure, it will be apparent that the disclosed construction is subject to modifications apparent to those skilled in the art without departing from the principles of this invention.

We claim:

1. In a wheel-supported ground-working agricultural implement including a tool supporting frame, a rear wheel structure comprising a pair of parallel links pivotally mounted at one end on said supporting frame, a spindle housing carried by the free end portion of said parallel links, a spindle rotatably disposed within said housing and including a rearwardly extending lower portion mounting a rear wheel thereon, means for moving said housing vertically relative to said frame, and means for locking said spindle and rear wheel in position with respect to said frame to provide a straight path of movement for said rear wheel, said locking means comprising a cam member carried at the upper end of said spindle in fixed relation thereto, said cam member including a generally upwardly facing curving surface including a pair of side wall portions and a lower center portion, and a conical roller member rotatably mounted on said frame in position for engagement with said curving surface, said curving surface being shaped to contact said conical roller throughout the length thereof and having a portion disposed generally helically about said cam member, whereby vertical movement of said wheel structure and said cam member is effective to provide for engagement of said conical roller with said curving surface and said roller is movable along said curving surface to said lower center portion thereof to thereby swing the rear wheel and lock it in position with respect to said frame.

2. A control for the tail wheel on a plow of the type having a wheel carried frame adapted to be raised and lowered and a tail wheel having an axle including an upwardly directed spindle portion, the combination of a housing member in which said spindle portion is journaled for rotating movement for castering action of the tail wheel, means for raising and lowering said frame relatively to said housing member, a cam member fixed in relation to said spindle portion and providing a cam track, a tapered roller journaled on the frame in position to contact the cam track for controlling said castering action as the frame is lowered, the cam track being shaped to be contiguous with the tapered roller in all positions of contact therewith, said cam track having an upper portion arranged generally helically about said spindle portion, merging into a downwardly directed substantially straight guiding portion generally parallel to the axis of said spindle, and a lower portion of upwardly open U shape contoured to fit about the tapered roller, said cam track continuing upwardly on the other side of said lower portion generally helically about said spindle.

3. A control for the tail wheel on a plow of the type having a wheel carried frame adapted to be raised and lowered and a tail wheel having an axle including an upwardly directed spindle portion, the combination of a housing member in which said spindle portion is journaled for rotating movement for castering action of the tail wheel, means for raising and lowering said frame relatively to said housing member, a cam member fixed in relation to said spindle portion and providing a cam track, a tapered roller journaled on the frame in position to contact the cam track for controlling said castering action as the frame is lowered, the cam track being shaped to be contiguous with the tapered roller in all positions of contact therewith, said cam track having an upper portion arranged generally helically about said spindle portion, merging into a downwardly directed substantially straight guiding portion generally parallel to the axis of said spindle, and a lower portion contoured to fit about the tapered roller for locking the tail wheel in non-castering position.

4. A control for the tail wheel on a plow of the type having a wheel carried frame adapted to be raised and lowered and a tail wheel having an axle including an upwardly directed spindle portion, the combination of a housing member in which said spindle portion is journaled for rotating movement for castering action of the tail wheel, means for raising and lowering said frame relatively to said housing member, a cam member fixed in relation to said spindle portion and providing a cam track, a tapered roller journaled on the frame in position to contact the cam track for controlling said castering action as the frame is lowered, the cam track being shaped to be in contact with the tapered roller throughout its length in all positions of contact therewith, said cam track having an upper portion arranged generally helically about said spindle portion for restoring said spindle to straight position after a turn in one direction, said upper portion merging into a downwardly directed substantially straight guiding portion generally parallel to the axis of said spindle for maintaining said straight position during limited raising movement of the frame, a lower portion contoured to fit about the tapered roller, and said cam track continuing upwardly on the other side of said lower portion generally helically about said spindle for restoring said spindle to straight position after a turn in the other direction.

References Cited in the file of this patent
UNITED STATES PATENTS

| | | |
|---|---|---|
| 1,865,598 | Verity | July 5, 1932 |
| 2,076,666 | Ohlendorf | Apr. 13, 1937 |